W. H. KETCHAM.
STRAINER.
APPLICATION FILED MAR. 13, 1911.
1,048,546.
Patented Dec. 31, 1912.
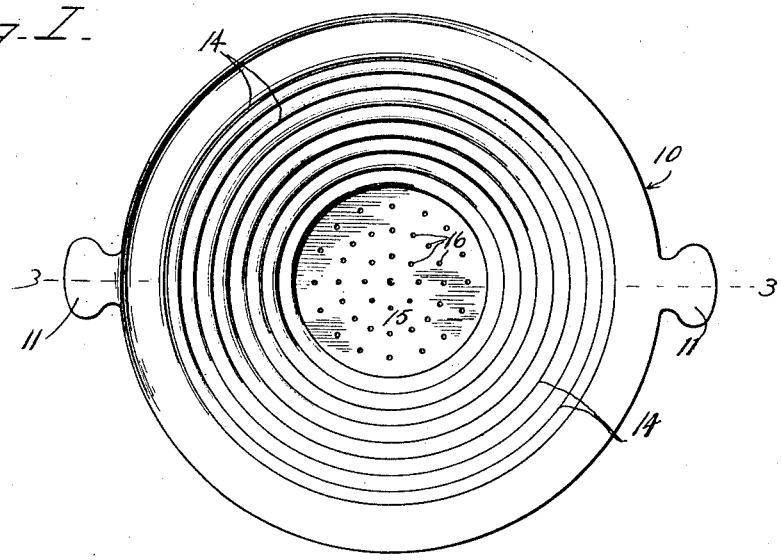
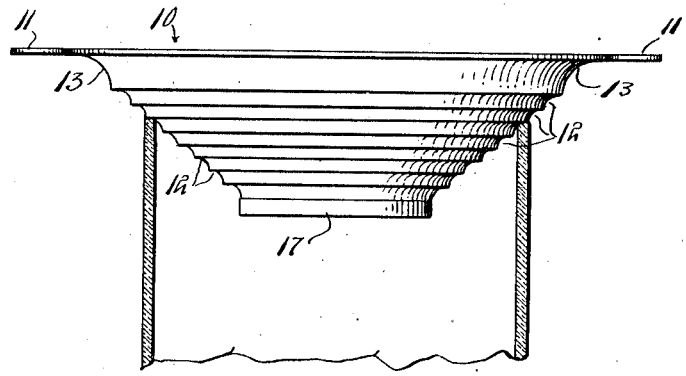
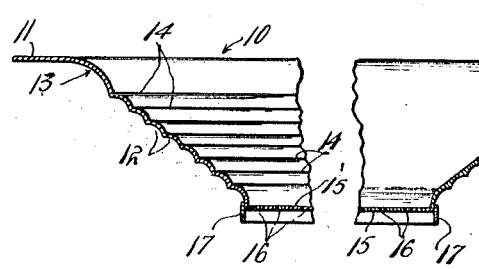
Witnesses
J. C. Simpson
J. E. Burch
Inventor
W. H. Ketcham.
By 
Attorneys

UNITED STATES PATENT OFFICE.

WILLIAM H. KETCHAM, OF OAKLAND, CALIFORNIA.

STRAINER.

1,048,546.  Specification of Letters Patent.  Patented Dec. 31, 1912.

Application filed March 13, 1911. Serial No. 614,076.

*To all whom it may concern:*

Be it known that I, WILLIAM H. KETCHAM, a citizen of the United States, residing at Oakland, in the county of Alameda, State of California, have invented certain new and useful Improvements in Strainers; and I do hereby declare the following to be a full, clear, and exact description of the invention, such as will enable others skilled in the art to which it appertains to make and use the same.

This invention has relation to new and useful improvements in strainers, it being an important object of the invention to provide a simple device of this character which may be applicable to many usages.

A further object of the invention and an important feature thereof is to construct a strainer which will properly fit the rims of glasses or other vessels of varying diameters without supporting the same in position by the hand.

A further object is to construct a strainer which may be stamped from a single section of sheet material or molded in form as desired, thereby rendering the same inexpensive and cheap to manufacture.

The invention consists in certain other combinations and arrangements of parts as will be hereinafter more fully described and clearly specified in the appended claims.

In the drawings:—Figure 1 is a plan view of my improved strainer. Fig. 2 is a side elevation thereof showing the strainer engaged in a portion of a glass. Fig. 3 is a transverse section taken on the line 3—3 of Fig. 1. Fig. 4 is a similar view but showing a modified construction.

Referring to the drawings in detail, there is shown my improved strainer which is in the form of a truncated cone 10, said cone being adapted to be stamped from a single section of the sheet material or molded as desired and provided with integral oppositely extending finger pieces 11 by which the strainer may be manipulated. The truncated or tapered walls of the cone are provided with a series of concaved corrugations or depressions 12 formed in varying diameters, the uppermost 13 of which, is preferably of greater depth than those disposed therebeneath, so that the strainer will accurately fit a vessel whose diameter approximates its diameter adjacent such portion.

The concaved depressions 12 form convexed surfaces or ridges 14 upon the interior surface of the strainer, or the same may be an uninterrupted surface as shown in Fig. 4 of the drawings, the corrugations serving the same purpose. The bottom 15 of the strainer is formed with a series of perforations 16 providing a foraminous bottom for straining suitable liquids as may be desired and at the lowermost corrugations 12 the strainers are formed with a depending flange 17 adapted to direct the strained contents into the receptacle in which the strainer is disposed. In placing the strainer in a vessel the corrugations 12 will readily adapt themselves to the diameter of the vessel or glass with which the strainer has been especially used, and by reason of the concaved depressions, the adjacent depressions will snugly fit the inner wall of the vessel and also extend beyond the rim thereof within the limits of the diameter of the strainer and insure of the retention of the strained liquid and the deposit of any larger materials in the bottom of the strainer without escape to the sides of the vessel.

It is thus apparent that the strainer is adapted for use in connection with vessels varying in diameter, fitting the larger one as well as the smaller one and permitting its construction of sheet metal, glass or other material which may be molded in form.

I claim:—

1. A strainer consisting of a vessel in the form of a truncated cone, said vessel being provided throughout its outer sides with annular concaved depressions disposed in stepped relation for engagement with the surrounding edge walls of receptacles of various diameters.

2. A strainer comprising a base member, a body portion tapering downwardly thereto, the face of the body portion having a succession of circumscribing transversely arc-shaped depressions springing one from another and resultant intervening circumscribing ridges, whereby there are formed a succession of receptacle receiving annular depressions of various diameters and handles located above said depressions.

In testimony whereof, I affix my signature, in presence of two witnesses.

WILLIAM H. KETCHAM.

Witnesses:
 HILDA GOHRMAN,
 GEO. DE GOBA.